May 22, 1945.　　　J. R. HEIDLOFF　　　2,376,431

FLUID TRANSMISSION

Filed May 5, 1941

INVENTOR.
JOSEPH R. HEIDLOFF
BY C. H. Fowler
ATTORNEY

Patented May 22, 1945

2,376,431

UNITED STATES PATENT OFFICE 2,376,431

FLUID TRANSMISSION

Joseph R. Heidloff, Detroit, Mich., assignor to Bendix Aviation Corporation, Detroit, Mich., a corporation of Delaware Application May 5, 1941, Serial No. 392,009

8 Claims. (Cl. 60—54)

This invention relates to fluid transmissions, and more particularly to turbo drives for motor vehicles.

Broadly the invention comprehends a fluid transmission including an impeller, a turbine for cooperation therewith, and a retractable reaction member associated with the turbine and automatically operative under the influence of dynamic pressure on the fluid in the apparatus to transpose the apparatus from a torque converter into a fluid coupling, and vice versa.

In this type of turbo drives, free movement of the reaction member is impaired to some extent because of frictional resistance between relatively movable parts during the initial movement of the member into the fluid circuit.

It has also been observed that the movement of the reaction member into and out of the fluid circuit is accompanied by considerable thrust in both directions of movement, resulting in shock and a disagreeable click.

It is the aim of the instant invention to overcome these objections.

An object of the invention is to provide means for eliminating frictional resistance introduced between relatively movable parts.

Another object of the invention is to provide a turbo drive having a retractable reaction member, and means shielding the member effective to reduce frictional resistance to free movement thereof.

Another object of the invention is to provide a turbo drive including a retractable reaction member, and means for cushioning the member at both ends of its stroke.

Other objects and advantages of the invention will appear from the following description taken in connection with the drawing forming a part of this specification, and in which—

Figure 1:
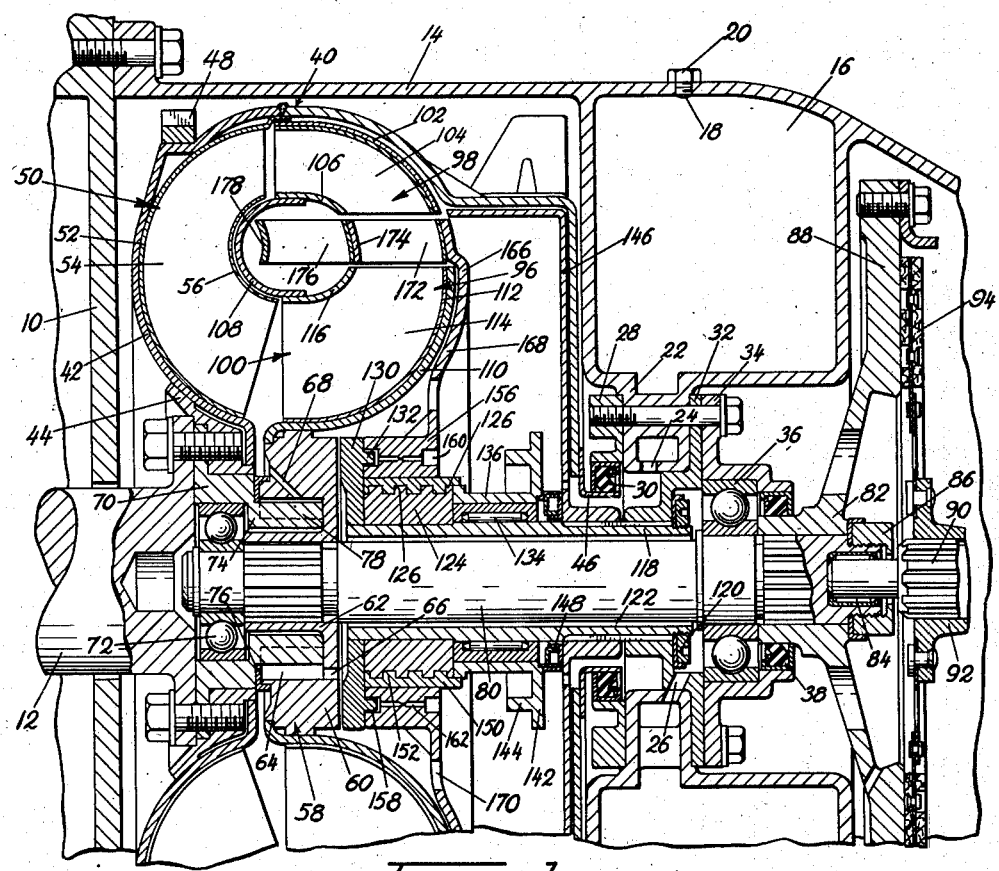
Fig. 1 is a view of a turbo torque converter, partly in section and partly broken away, and embodying the invention.
Figure 2:
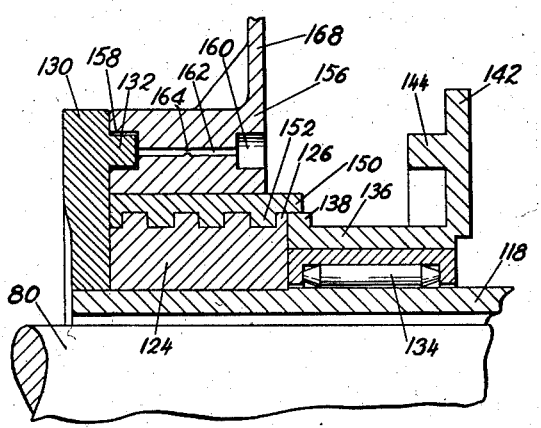
Fig. 2 is an enlarged fragmentary view illustrating a feature of a part of the invention.
Figure 3:
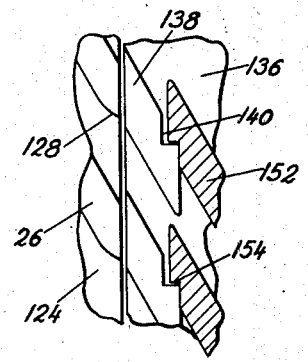
Fig. 3 is a diagrammatical view illustrating the screw for the reaction member.

Referring to the drawing for more specific details of the invention, 10 represents the crank case of an internal combustion engine, and 12 the crank shaft of the engine. The crank case has secured thereto a bell housing 14 having therein a reservoir 16 provided with a filling opening 18 normally closed as by a plug 20. The reservoir has a hollow flange 22 communicating directly with the reservoir, and the flange has an inlet port 24 and a discharge port 26.

A ring 28 mounted on one side of the flange supports a fluid seal 30, and mounted on the other side of the flange is a pair of rings 32 and 34. The former is internally splined, and the latter supports a bearing 36 and a fluid seal 38.

A torque converter indicated generally at 40 includes a housing 42 having a concentrically disposed hub 44 suitably secured to the crank shaft 12, and a hub 46 arranged in oppositely disposed relation to the hub 44 and embracing the fluid seal 30. The housing 42 has thereon a ring gear 48 for connection of a starter, not shown, and fixedly secured to the inner wall of the housing is an impeller 50 including an outer shroud 52 having arranged thereon spaced blades 54 supporting an inner shroud 56.

A rotary pump indicated generally at 58 includes a housing 60 having a concentrically disposed internal sleeve 62 and an eccentrically disposed chamber 64, and the chamber has an inlet port 66 and a discharge port 68, the latter communicating with the vortex chamber of the converter.

A hub 70 suitably secured to the driving shaft 12 has an axial bore, and fitted in this bore is a bearing 72. The hub also has a concentrically disposed sleeve 74 extended through a cover plate 76 of the pump housing into the chamber 64 of the pump, and the sleeve is deformed to provide a rotor 78.

A center shaft 80 supported for rotation on the bearings 36 and 72 has splined thereto a hub 82 embraced by the fluid seal 38 so as to inhibit seepage of fluid from the housing 42. The shaft also has a concentric bore, and fitted in this bore is a bearing 84.

The hub 82 is held against displacement by a retaining ring 86 threaded on the shaft, and the hub carries a clutch member 88. A driven shaft 90 supported for rotation on the bearing 84 has splined thereto for relative axial movement and for rotation with the shaft a hub 92 carrying a clutch member 94 for cooperation with the clutch member 88.

The pump housing 60 is splined to the center shaft 80, and a turbine indicated generally at 96 is mounted upon the pump housing for rotation therewith. The turbine has two stages 98 and 100. As shown, the first stage of the turbine includes an outer shroud 102 having arranged thereon spaced vanes 104 secured to an inner shroud section 106 fixedly secured to an inner shroud section 108 arranged adjacent the inner shroud section 56; and the second stage of the turbine includes a web 110 mounted on the pump housing 60, and an outer shroud 112 secured to the web having arranged thereon spaced vanes 114 supporting an inner shroud section 116 fixedly secured to the inner shroud section 108.

A sleeve 118 slipped over the center shaft 80 and splined to the ring 32 is held against displacement by a retaining ring 120. The sleeve is supported in spaced relation to the center shaft 80 and provides in conjunction therewith an annular passage 122 providing a communication between the discharge port 26 of the reservoir and the intake port 68 of the pump. The sleeve 118 has fixedly secured thereon a heavy sleeve 124 provided with external threads 126 having beveled approaches 128, and a crown ring 130 in abutting relation to the sleeve 124 and adjacent the pump housing 60 has thereon a ring piston 132, the purpose of which will hereinafter appear.

The sleeve 118 also has thereon a needle bearing 134 supporting for slight rotation a sleeve 136 having on one end thereof short threads 138 notched to provide dogs 140, and the sleeve 136 has a flange 142 having thereon a ring piston 144 in axial alignment with the ring piston 132.

A shield 146 keyed to the sleeve 118 conforms to the adjacent wall of the housing 42, and the shield has spaced openings therethrough for the passage of fluid from the housing through the hub 46 and intake port 24 into the reservoir, and fitted on the sleeve 118 between the sleeve 136 and the shield 146 is a parallel brake 148 yieldingly resisting rotation of the sleeve 136.

A carrier 150 has internal threads 152 for cooperation with the threads 126 and 138 on the sleeves 124 and 136, respectively, and on the approach ends of the threads 152 are dogs 154 for cooperation with the dogs 140 on the threads 138 of the sleeve 136.

A heavy ring 156 fixedly secured to the carrier 150 has in its respective ends ring cylinders 158 and 160 for the reception of the oppositely disposed ring pistons 132 and 144, and spaced channels 162 connecting the cylinders have therein restrictions 164. In place of the restrictions, the channels may have therein two-way valves or any other suitable means for control of the flow of fluid through the channels.

The ring 156 has thereon a reaction member 166. This reaction member includes a web 168 integral with the ring 156. The web 168 has spaced openings 170 therethrough for the free passage of fluid, and a plurality of vanes 172 movable between the first and second stages of the turbine, and the vanes 172 have secured thereto a shroud 174 having thereon spaced guide vanes 176 supporting a shroud 178.

In a normal operation, assuming that the unit is filled with fluid to its normal capacity, transmission of force from the power plant to the crank shaft 12 results in driving the impeller 50 and the pump 58 and the consequent delivery of fluid to the impeller by the pump at a rate proportionate to the speed of rotation of the crank shaft. The impeller energizes the fluid, and the energy of the fluid is received on the vanes constituting the first stage 98 of the turbine, and on the reaction vanes 172 of the reaction member, causing rotation of the turbine.

This rotation of the turbine results in driving the center shaft 80 and the driven shaft 90 clutched thereto. Upon rotation of the center shaft, the housing of the pump 58 is driven, and, accordingly, a smaller volume of fluid is delivered to the impeller because the differential in speed of the impeller and turbine now becomes less.

As the speed of rotation of the impeller increases, the energy of the fluid increases proportionately, and this increased energy of the fluid acting on the vanes of the turbine causes increase in speed of the turbine. As this increased speed approaches that of the impeller, the angle of the fluid leaving the first stage 98 of the turbine shifts from impinging on the faces of the reaction vanes 172 to impinge upon the backs of these vanes, causing the reaction member to spiral on the threaded sleeve 124 out of the fluid circuit onto the sleeve 136, and as the reaction member retracts, the guide vanes 176 carried on a shroud supported on the reaction vanes move in between the first and second stages of the turbine and direct the flow of fluid from the first stage 98 of the turbine to the second stage 100 thereof, and under this condition the transmission functions as a fluid coupling.

Upon decrease in difference of the speed of rotation of the impeller and the turbine, the volume of fluid delivered by the pump decreases proportionately. As an increased load is imposed on the turbine, the differential in speed increases, and the pump delivers an increased volume of fluid. Concomitantly therewith, the angle of discharge from the first stage of the turbine shifts because of demand of torque ratio, and impinges on the face of the index vanes 176, causing the reaction member to spiral into the fluid circuit.

Upon initial movement of the reaction member tending to spiral into the fluid circuit, the threads 152 on the carrier of the reaction member disengage the dogs 154 thereon from the dogs 140 on the threads 138, and engage the threads 138 on the sleeve 136 and advance thereon to the approaches 128 on the threads 126. The approaches 128 serve to guide the threads 152 into engagement with the threads 126, and as the carrier advances on the threads 126 the reaction member 166 spirals into the fluid circuit.

Heretofore, in this operation, during the initial movement of the reaction member into the fluid circuit, frictional resistance to the movement was encountered because of the reverse directions of rotation of the housing 42 and the reaction member 166. This resulted in imposing material drag on the reaction member detrimental to its efficiency. To eliminate this objectional feature, the instant invention contemplates interposing a stationary shield 146 between the housing 40 and the reaction member 166. The operation of the reaction member has been further improved by the introduction of snubbing action at each end of the stroke of the member. In the instant disclosure, this snubbing action takes the form of fluid pressure units such as ring cylinders and pistons.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid transmission comprising a rotatable housing, an impeller and a turbine in the housing providing in conjunction with one another a fluid circuit, means for supplying fluid to the circuit, a retractable reaction member rotatably movable into and out of the circuit, means supported in a fixed position between the housing and the member for shielding the member when in retracted position, and means for cushioning the reaction member in both directions of movement.

2. A fluid transmission comprising a rotatable housing, an impeller therein, a turbine associated with the impeller and providing in conjunction therewith a fluid circuit, a reaction member adapted to spiral into and out of the circuit, a stationary shield between the housing and reaction member for reducing frictional resistance imposed on the reaction member during a part of the movement of the member into the circuit, and means for snubbing the movement of the reaction member in both directions.

3. A fluid transmission comprising an impeller, a turbine providing in conjunction therewith a fluid circuit, a fixed support, a reaction member on the support movable into and out of the circuit, oppositely disposed interconnected cylinders carried by the member, and stationary pistons on the support cooperating with the cylinders.

4. A fluid transmission comprising an impeller, a turbine providing in conjunction therewith a fluid circuit, a fixed support, a reaction member on the support movable into and out of the circuit, oppositely disposed interconnected ring cylinders carried by the member, and spaced ring pistons on the support adapted to be received by the cylinders.

5. A fluid transmission comprising a rotatable housing having therein primary means for energizing fluid and secondary means receiving energy from the fluid providing in conjunction with one another a vortex chamber, a fixed support, guide means for the fluid on the support operative to move into and out of the chamber, stationary means for shielding the guide means while not in the chamber, and means carried by the guide means cooperating with means on the fixed support for cushioning the guide means in both directions of movement.

6. A fluid transmission comprising a rotatable housing having therein a primary means for energizing fluid and secondary means for receiving energy from the fluid providing in conjunction with one another a fluid power transmitting circuit, a fixed support, fluid guide means on the support operative to move into and out of the circuit, means rigidly mounted on the fixed support between the housing and the guide means for reducing friction imposed on the guide means during initial movement thereof into the circuit, and means carried by the guide means cooperating with means on the fixed support for cushioning the guide means at the end of its stroke in both directions of movement.

7. A fluid transmission comprising an impeller, a turbine providing in conjunction therewith a fluid circuit, a fixed support, a reaction member on the support operative to move into and out of the circuit, oppositely disposed interconnected cylinders on the member, and pistons on the support adapted to cooperate with the cylinders to cushion the reaction member in both directions of movement.

8. A fluid transmission comprising an impeller, a turbine providing in conjunction therewith a fluid circuit, a fixed support, a reaction member on the support operative to move into and out of the circuit, oppositely disposed cylinders on the member connected by a restricted passage, and pistons on the support adapted to cooperate with the cylinders to cushion the reaction member in both directions of movement.

JOSEPH R. HEIDLOFF.